(12) United States Patent
Alonso et al.

(10) Patent No.: US 10,766,189 B2
(45) Date of Patent: Sep. 8, 2020

(54) CONTAINER FOR 3D PRINTED OBJECTS AND METHOD OF COOLING AND UNPACKING A MANUFACTURED OBJECT FROM A 3D PRINTER USING THAT CONTAINER

(71) Applicants: Xavier Alonso, Sant Cugat del Valles (ES); Ismael Chanclon, Sant Cugat del Valles (ES); Marc Morros, Terrassa (ES); Marc Nicolau, Barcelona (ES); HEWLETT-PACKARD DEVELOPMENT COMPANY, L.P., Houston, TX (US)

(72) Inventors: Xavier Alonso, Sant Cugat del Valles (ES); Ismael Chanclon, Sant Cugat del Valles (ES); Marc Morros, Terrassa (ES); Marc Nicolau, Barcelona (ES)

(73) Assignee: Hewlett-Packard Development Company, L.P., Spring, TX (US)

( * ) Notice: Subject to any disclaimer, the term of this patent is extended or adjusted under 35 U.S.C. 154(b) by 37 days.

(21) Appl. No.: 16/071,726

(22) PCT Filed: May 12, 2016

(86) PCT No.: PCT/EP2016/060780
§ 371 (c)(1),
(2) Date: Jul. 20, 2018

(87) PCT Pub. No.: WO2017/194144
PCT Pub. Date: Nov. 16, 2017

(65) Prior Publication Data
US 2019/0054697 A1    Feb. 21, 2019

(51) Int. Cl.
*B29C 64/379* (2017.01)
*B33Y 30/00* (2015.01)
(Continued)

(52) U.S. Cl.
CPC .......... *B29C 64/141* (2017.08); *B22F 3/1055* (2013.01); *B29C 37/0003* (2013.01);
(Continued)

(58) Field of Classification Search
CPC . B29C 64/141; B29C 37/0003; B29C 64/314; B29C 64/255; B29C 64/393;
(Continued)

(56) References Cited

U.S. PATENT DOCUMENTS 4,005,956 A * 2/1977 Inoue ................ B22F 1/0081
425/78
5,622,577 A 4/1997 O'Connor
(Continued)

FOREIGN PATENT DOCUMENTS

CN        104190928      12/2014
DE    10 2012 106 141    1/2014
(Continued)

OTHER PUBLICATIONS

Morris, Amanda; "A New Way to Print 3-D Metals and Alloys"; Jan. 11, 2016; http://www.mccormick.northwestern.edu/news/articles/2016/01/a-new-way-to-print-3-d-metals-and-alloys.

*Primary Examiner* — Nahida Sultana
(74) *Attorney, Agent, or Firm* — HP Inc. Patent Department

(57) ABSTRACT

A container (140) for receiving a manufactured object (160) from a 3D printer is disclosed. A method for cooling and unpacking 3D printed objects using that container. (140) is also disclosed. The container has a wall forming the sides of the container, a top extending to the sides of the container, a connector (142) for connection to a vacuum source and a guillotine member (150). The lower portion of the container has support members to slidably receive the guillotine member (150) to form a base of the container. The guillotine (Continued)

member is selectively configurable between an apertured configuration having a plurality of through holes (152) to allow passage of air and/or build material, and a closed configuration in which the through holes are closed so as to prevent build material from falling out of the container.

15 Claims, 9 Drawing Sheets

(51) Int. Cl.

| | | |
|---|---|---|
| *B29C 64/141* | (2017.01) | |
| *B33Y 40/00* | (2020.01) | |
| *B29C 64/35* | (2017.01) | |
| *B29C 37/00* | (2006.01) | |
| *B22F 3/105* | (2006.01) | |
| *B29C 64/357* | (2017.01) | |
| *B29C 64/25* | (2017.01) | |
| *B29C 64/314* | (2017.01) | |
| *B29C 64/255* | (2017.01) | |
| *B29C 64/393* | (2017.01) | |
| *B29C 64/227* | (2017.01) | |
| *B29C 64/153* | (2017.01) | |
| *B29C 64/165* | (2017.01) | |
| *B29C 35/16* | (2006.01) | |
| *B33Y 10/00* | (2015.01) | |

(52) U.S. Cl.
CPC .......... *B29C 64/227* (2017.08); *B29C 64/25* (2017.08); *B29C 64/255* (2017.08); *B29C 64/314* (2017.08); *B29C 64/35* (2017.08); *B29C 64/357* (2017.08); *B29C 64/379* (2017.08); *B29C 64/393* (2017.08); *B33Y 30/00* (2014.12); *B33Y 40/00* (2014.12); *B22F 2003/1059* (2013.01); *B22F 2999/00* (2013.01); *B29C 64/153* (2017.08); *B29C 64/165* (2017.08); *B29C 2035/1658* (2013.01); *B33Y 10/00* (2014.12); *Y02P 10/295* (2015.11)

(58) Field of Classification Search
CPC ... B29C 64/227; B29C 64/379; B29C 64/357; B29C 64/25; B29C 64/35; B29C 64/153; B29C 64/165; B29C 2035/1658; B22F 2003/1059; B22F 3/1055; B22F 2999/00; B33Y 30/00; B33Y 40/00; B33Y 10/00; Y02P 10/295

See application file for complete search history.

(56) References Cited

U.S. PATENT DOCUMENTS

| | | | |
|---|---|---|---|
| 8,798,780 B2 | 8/2014 | Menchik et al. | |
| 2004/0084814 A1 | 5/2004 | Boyd et al. | |
| 2006/0118532 A1* | 6/2006 | Chung | B29C 64/153 |
| | | | 219/121.85 |
| 2006/0141145 A1 | 6/2006 | Davidson et al. | |
| 2008/0060330 A1 | 3/2008 | Davidson et al. | |
| 2010/0228381 A1* | 9/2010 | Matsui | B29C 64/165 |
| | | | 700/120 |
| 2017/0120521 A1* | 5/2017 | Sakura | B33Y 30/00 |
| 2018/0333778 A1* | 11/2018 | Sloderbeck | B22F 3/093 |
| 2019/0009338 A1* | 1/2019 | McMurtry | B22F 3/1055 |
| 2019/0060998 A1* | 2/2019 | Kelkar | B22F 3/1055 |
| 2019/0143597 A1* | 5/2019 | Huang | B33Y 40/00 |
| | | | 425/166 |

FOREIGN PATENT DOCUMENTS

| | | |
|---|---|---|
| DE | 10 2012 018 366 | 3/2014 |
| WO | WO2014049159 A1 | 4/2014 |
| WO | WO-2015051261 | 4/2015 |
| WO | WO-2016030530 | 3/2016 |

* cited by examiner

| | Valve | | | | | | | | | | | |
|---|---|---|---|---|---|---|---|---|---|---|---|---|
| | 250 | 244 | 256 | 276 | 248 | 258 | 242 | 262 | 260 | 254 | 252a | 252b |
| Recovered build material tank to mixing tank | | | ✓ | | | | | | | | | |
| Fresh build material supply tank 214a to mixing tank | | | | | | | | | | ✓ | ✓ | |
| Fresh build material supply tank 214b to mixing tank | | | | | | | | | | ✓ | | ✓ |
| Unload mixing tank | | | | | | | | | | ✓ | | |
| Working area to recovered build material tank | | | | ✓ | | | ✓ | | | | | |
| Working area to overflow tank | | ✓ | | | ✓ | | | | | | | |
| Overflow tank to recovered build material tank | ✓ | | | | | | | | | | | |
| Empty powder trap 220 | | | | | | | | ✓ | | | | |
| Purge process | | | ✓ | ✓ | | ✓ | | | ✓ | | | |

FIG. 2B

CONTAINER FOR 3D PRINTED OBJECTS AND METHOD OF COOLING AND UNPACKING A MANUFACTURED OBJECT FROM A 3D PRINTER USING THAT CONTAINER

There is disclosed containers for 3D printed objects. Once a 3D object is printed, it is left to cool. The cooling process can take many hours, typically 30 to 35 hours. During this time, the printer may be occupied by the 3D objects, causing inefficiency in the printing cycle.

BRIEF DESCRIPTION OF THE DRAWINGS

The accompanying drawings, in which:

FIG. 2B is a table schematically illustrating example valve setting information for the material management station internal circuit of FIG. 2A;

DETAILED DESCRIPTION

Figure 1A:
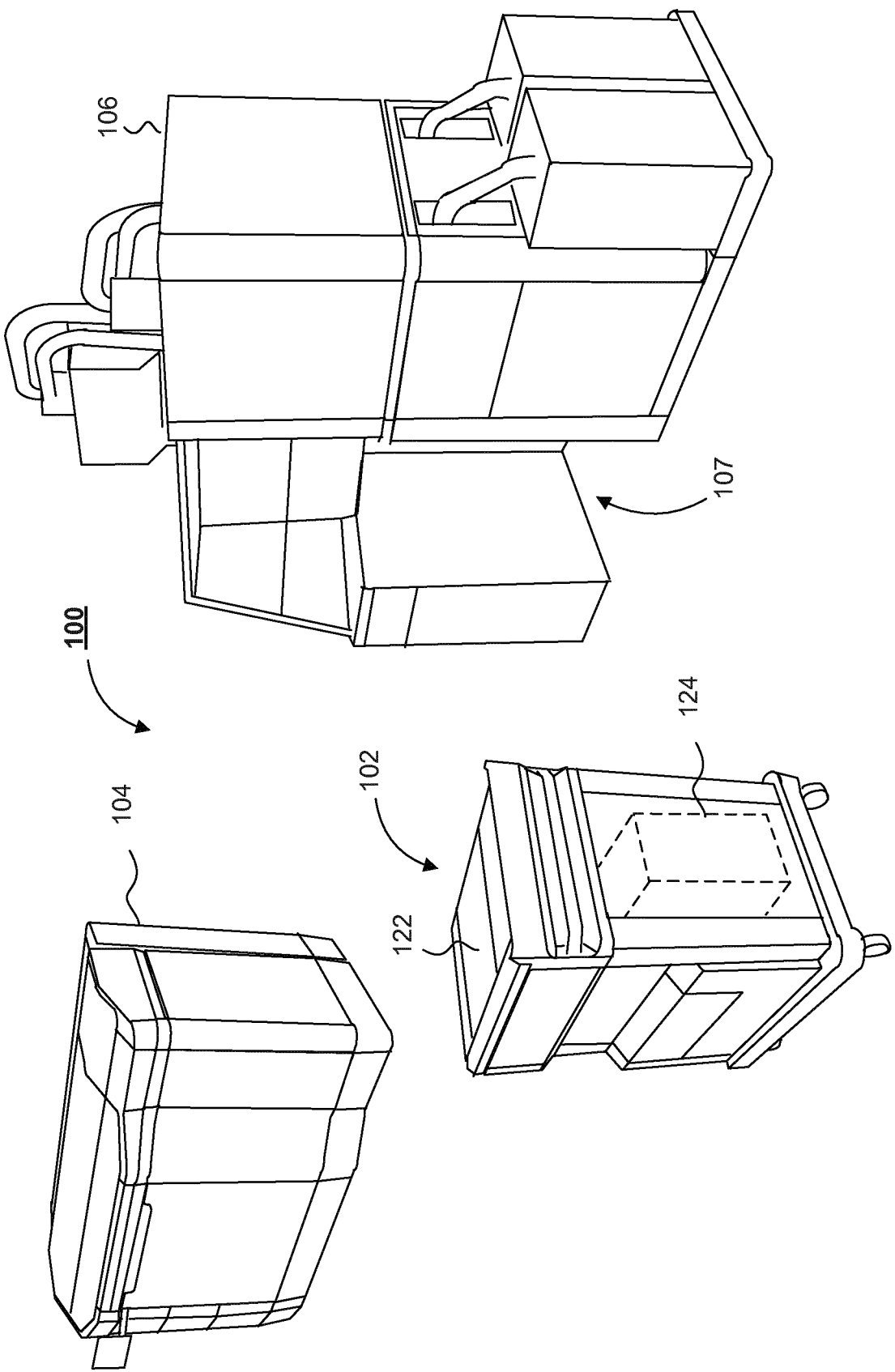
FIG. 1A schematically illustrates an example of a three dimensional (3D) printing system.

As shown in FIG. 1A, the three dimensional (3D) printing system 100 (or additive manufacturing system) according to one example comprises: a trolley 102, a 3D printer 104 and a material management station 106. The material management station 106 manages build material.

The trolley 102 is arranged to slot into a docking position in the printer 104 to allow the printer 104 to generate a 3D object within the trolley. The trolley is also arranged to also slot (at a different time) into a docking position 107 in the material management station 106. The trolley 102 may be docked in the material management station 106 prior to a 3D printing process to load the trolley with build material in preparation for a subsequent 3D printing process.

The build material loaded into the trolley may include recycled or recovered build material from one or more previous printing processes, fresh build material or a portion of fresh and recycled build material. Some build materials may be non-recyclable and hence in this case no recovered build material will be used to load the trolley. The build material may be or include, for example, powdered metal materials, powdered composited materials, powder ceramic materials, powdered glass materials, powdered resin material, powdered polymer materials and the like. In some examples where the build material is a powder-based build material, the term powder-based materials is intended to encompass both dry and wet powder-based materials, particulate materials and granular materials. It should be understood that the examples described herein are not limited to powder-based materials, and may be used, with suitable modification if appropriate, with other suitable build materials. In other examples, the build material may be in the form of pellets, or any other suitable form of build material, for instance.

Returning to FIG. 1A, the trolley 102 may also be docked in the docking position 107 in the material management station 106 (shown without the trolley 102 docked in FIG. 1A) to clean up at least some components of the trolley 102 after it has been used in a 3D printing production process. The clean-up process may involve recovery and storage in the material management station 106 of unfused build material from the previous print job for subsequent reuse. During a 3D printing process a portion of the supplied build material may be fused to form the 3D object, whilst a remaining portion of the supplied build material may remain unfused and potentially recyclable, depending upon the type of build material used. Some processing of the unfused build material may be performed by the material management station 106 prior to storage for recycling, to reduce any agglomeration for example.

It will be understood that the material management station 106 may also include an access panel (not shown) to cover the docking position 107 when the trolley 102 is fully docked with the material management station 106 and when the trolley 102 is fully removed from the material management station 106.

One material management station 106 can be used to service one or more different 3D printers. A given 3D printer may interchangeably use one or more trolleys 102, for example, utilising different trolleys for different build materials. The material management station 106 can purge a trolley 102 of a given build material after a 3D printing production process, allowing it to be filled with a different build material for a subsequent 3D printing production run. Purging of the trolley 102 may also involve purging of the material management station 106 or alternatively, it may involve separation of different build materials in the material management station 106 to prevent contamination of one build material type with another.

The trolley 102 in this example has a build platform 122 on which an object being manufactured is constructed. The trolley 102 also comprises a build material store 124 situated beneath a build platform 122 in this example. The build platform 122 may be arranged to have an actuation mechanism (not shown) allowing it, when it is docked in the printer 104 and during a 3D printing production process, to gradually move down, such as in a step-wise manner, towards the base of the trolley 102 as the printing of the 3D object progresses and as the build material store 124 within the trolley 102 becomes depleted. This provides progressively more distance between the base level of the build platform 122 and the print carriages (not shown) to accommodate the 3D object being manufactured. The size of an object being printed may increase progressively as it is built up layer-by-layer in the 3D printing process in this example.

The 3D printer 104 of this example can generate a 3D object by using a build material depositor carriage (not shown) to form layers of build material onto the build platform 122. Certain regions of each deposited layer are fused by the printer 104 to progressively form the object according to object-specifying data. The object-specifying data are based on a 3D shape of the object and may also provide object property data such as strength or roughness corresponding to the whole object or part(s) of the 3D object. In examples, the desired 3D object properties may also be supplied to the 3D printer 104 via a user interface, via a software driver or via predetermined object property data stored in a memory.

After a layer of the build material has been deposited on the build platform 122 by the printer 104, a page-wide array of thermal (or piezo) printheads on a carriage (not shown) of the 3D printer 104 can traverse the build platform 122 to selectively deposit a fusing agent in a pattern based on where particles of the build material are to fuse together. Once the fusing agent has been applied, the layer of build material may be exposed to fusing energy using one or more heating elements (not shown) of the 3D printer 104. The build material deposition, fusing agent and fusing energy application process may be repeated in successive layers until a complete 3D object has been generated. The material management station 106 may be used with any additive manufacturing technique and is not limited to printers using printheads on a carriage to deposit a fusing agent as in the example described above. For example, the material management station 106 may be used with a selective laser sintering additive manufacturing technique.

Figure 1B:
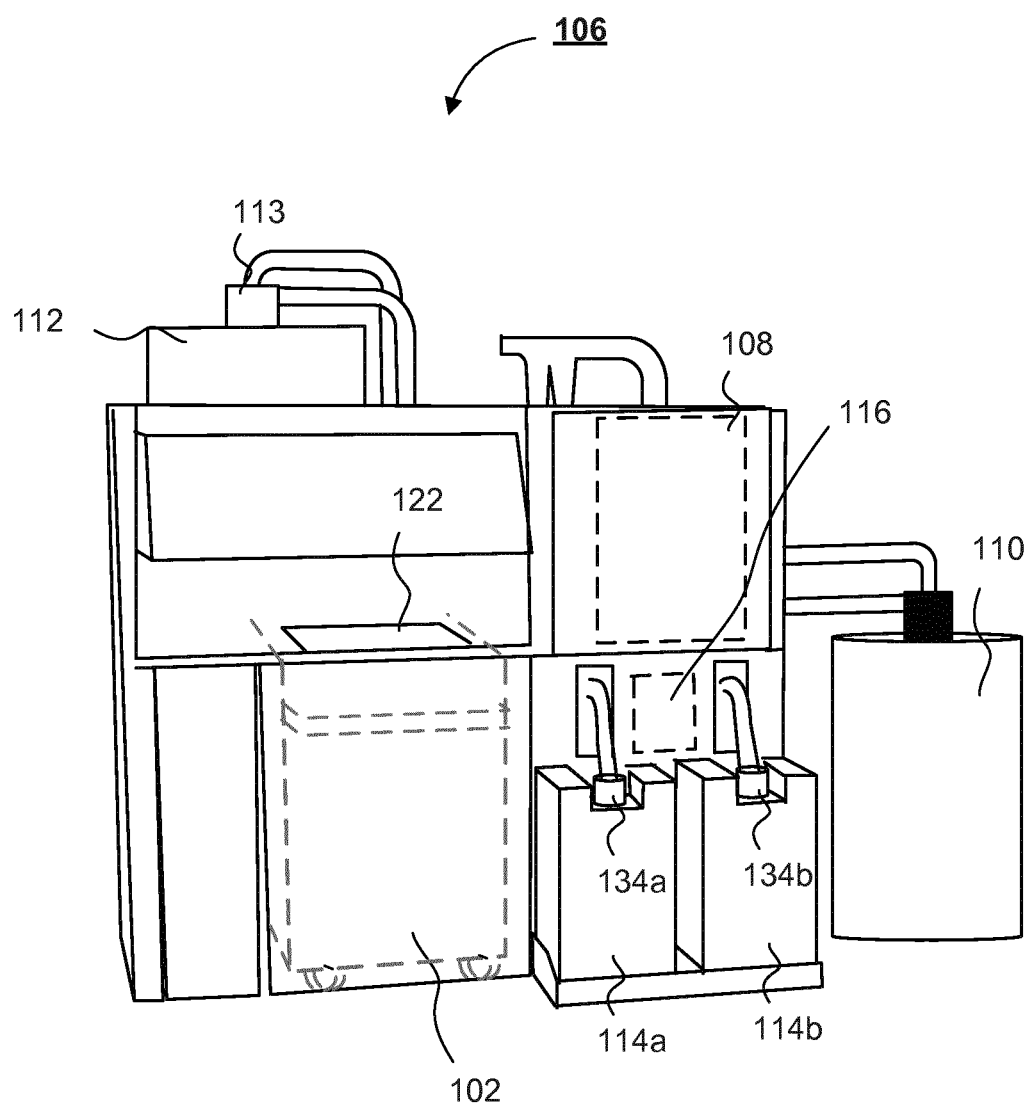
FIG. 1B schematically illustrates the material management station of the example of FIG. 1A.
Figure 1C:
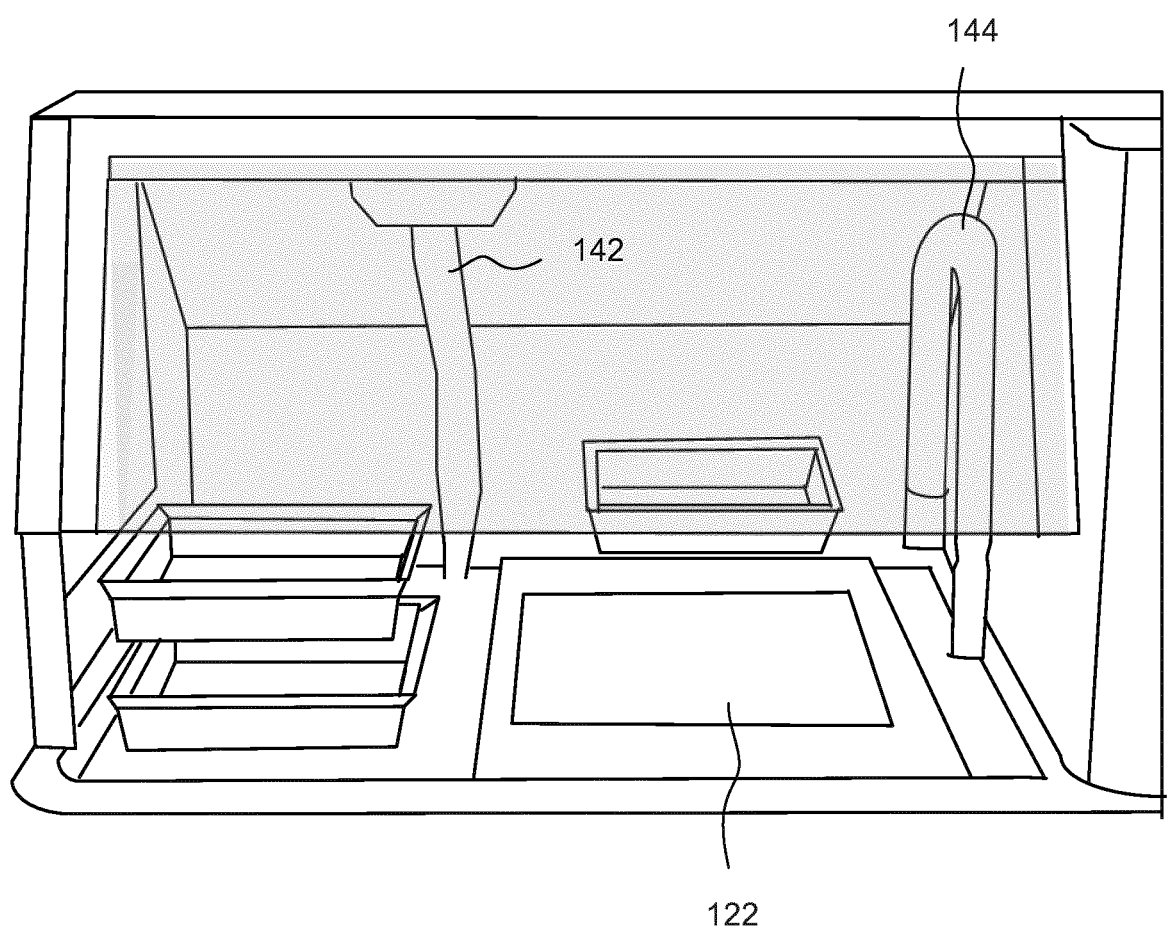
FIG. 1C schematically illustrates a working area of the material management station of the example of FIG. 1B.

FIG. 1B schematically illustrates the material management station 106 of the example of FIG. 1A, with the trolley 102 of FIG. 1A docked therein.

As shown in the example of FIG. 1B, the material management station 106 has two interfaces for receiving two fresh build material supply tanks (or cartridges) 114a, 114b, which may be releasably insertable in the material management station 106. In this example, each fresh build material supply tank 114a, 114b has a capacity of between about thirty and fifty litres. In one example, the build material may be a powdered semi-crystalline thermoplastic material. The provision of two fresh build material supply tanks 114a, 114b allows "hot swapping" to be performed such that if a currently active container becomes empty or close to empty of build material when the trolley 102 is being filled with build material by the material management station 106 in preparation for an additive manufacturing process, a fresh build material supply source can be dynamically changed to the other of the two tanks. The material management system 106 may have one or more weight measurement device(s) to assess how much fresh build material is present at a given time in one or more of the fresh build material supply tanks 114a, 114b. The fresh build material from the tanks 114a, 114b, may be consumed, for example, when loading the trolley 102 with build material prior to the trolley 102 being installed in the printer 104 for a 3D printing production run.

Build material is moved around within the material management station 106 in this example using a vacuum system (described below with reference to FIG. 2A), which promotes cleanliness within the system and allows for recycling of at least a portion of build material between successive 3D printing jobs, where the type of build material selected for use is recyclable. References to a vacuum system in this specification include a vacuum that is partial vacuum or a pressure that is reduced, for example, relative to atmospheric pressure. The vacuum may correspond to "negative pressure", which can be used to denote pressures below atmospheric pressure in a circuit surrounded by atmospheric pressure.

A total trolley-use time for printing of a 3D object before trolley 102 can be reused may depend upon both a printing time of the printer 104 when the trolley 102 is in the printer 104 and a cooling time of the contents of the build volume of the trolley 102. It will be understood that the trolley 102 can be removed from the printer 104 after the printing operation, allowing the printer 104 to be re-used for a further printing operation using build material within a different trolley before the total trolley-use time has elapsed. The trolley 102 can be moved to the material management station 106 at the end of the printing time. The vacuum system can be used, in some examples, to promote more rapid cooling of the contents of the build volume following a 3D print production process than would otherwise occur without the vacuum system. Alternative examples to the vacuum system such as a compressed air system can create excess dust, potentially making the clean-up process more difficult.

The material management station 106 in this example has a recovered build material tank 108 (see FIG. 1B), located internally, where build material recovered from the trolley 102 by the vacuum system is stored for subsequent reuse, if appropriate. Some build materials may be recyclable whilst others may be non-recyclable. In an initial 3D printing production cycle, 100% fresh build material may be used. However, on second and subsequent printing cycles, depending upon build material characteristics and user choice, the build material used for the print job may comprise a proportion of fresh build material (e.g. 20%) and a portion of recycled build material (e.g. 80%). Some users may elect to use mainly or exclusively fresh build material on second and subsequent printing cycles, for example, considering safeguarding a quality of the printed object. The internal recovered build material tank 108 may become full during a post-production clean-up process, although it may become full after two or more post-production clean up processes have been performed, but not before. Accordingly, an overflow tank in the form of an external overflow tank 110 can be provided as part of the material management station 106 to provide additional capacity for recovered build material for use once the internal recovered build material tank 108 is full or close to full capacity. Alternatively, the external overflow tank 110 can be a removable tank. In this example, one or more ports are provided as part of the material management station 106 to allow for output of or reception of build material to and/or from the external overflow tank 110. A sieve 116 or alternative build material refinement device may be provided for use together with the internal recovered build material tank 108 to make unfused build material recovered from a 3D printing production process for recycling more granular, that is, to reduce agglomeration (clumping).

The material management station 106 in this example has a mixing tank (or blending tank) 112 comprising a mixing blade (not shown) for mixing recycled build material from the internal recovered build material tank 108 with fresh build material from one of the fresh build material supply tanks 114a, 114b for supply to the trolley 102 when it is loaded prior to a printing production process. The mixing tank (or blending tank) 112, in this example, is provided on top of the material management station 106, above the location of the build platform 122 when the trolley 102 is docked therein. The mixing tank 112 is connected to a mixer build material trap 113 (described below with reference to FIG. 2A) for input of build material into the mixing tank 112.

The fresh build material supply tanks 114a, 114b, the external overflow tank 110 and the main body of the material management station 106 may be constructed to fit together in a modular way, permitting a number of alternative geometrical configurations for the fully assembled material management station 106. In this way, the material management station 106 is adaptable to fit into different housing spaces in a manufacturing environment.

The fresh build material supply tanks 114a, 114b may be releasably connected to the main body of the material management station 106 via respective supply tank connectors 134a, 134b. These supply tank connectors 134a, 134b may incorporate a security system to reduce the likelihood of unsuitable build material being used in the 3D printing system. In one example, suitable fresh build material supply tanks 114a, 114b are provided with a secure memory chip, which can be read by a chip reader (not shown) or other processing circuitry on the main body of the material management station 106 to verify the authenticity of any replacement supply tank (cartridge) 114a, 114b that has been installed. In this example, the chip reader may be provided on the supply tank connectors 134a, 134b and upon attachment of the fresh build material supply tanks 114a, 114b to the respective connector 134a, 134b, an electrical connection may be formed. The processing circuitry in the material management station 106 may also be used to write a measured weight of build material determined to be in the respective fresh build material supply tank(s) 114a, 114b onto the secure memory chip of the tank to store and/or update that value. Thus, the amount of authorised build material remaining in the fresh build material supply tank(s) 114a, 114b at the end of a trolley loading process can be recorded. This allows the withdrawal of particulate build material from the fresh build material supply tanks 114a, 114b beyond the quantity with which it was filled by the manufacturer to be prevented. For example, in the case of a fresh build material supply tank 114a, 114b from which the tank manufacturer's authorised fresh build material has previously been completely withdrawn, this prevents the withdrawal of further build material that may damage the printer or print quality, if the fresh build material supply tank were re-filled with alternative fresh build material.

The secure memory chip of the fresh build material supply tanks 114a, 114b can store a material type of the build material contained within the fresh build material supply tanks. In one example, the material type is the material (e.g. ceramic, glass, resin, etc.). In this way, the material management station 106 can determine the material type to be used by the material management station 106.

FIG. 10 schematically illustrates a working area of the material management station 106 of the example of FIG. 1B, showing the build platform 122 of the trolley 102 and a build material loading hose 142, which provides a path between the mixing tank 112 of FIG. 1B and the build material store 124 of the trolley 102. The loading hose 142 is used for loading the trolley 102 with build material prior to the trolley 102 being used in the printer 104. FIG. 10 also shows a recycling hose 144 for unpacking manufactured 3D objects, cleaning the build platform 122 of the trolley 102 and a surrounding working area within the material management station 106. In one example, the recycling hose 144 operates by suction provided via a pump 204 (see FIG. 2A) and provides an enclosed path to the recovered build material tank 108 (see FIG. 1B) for receiving and holding build material for re-use in a subsequent 3D printing process. The recycling hose 144 may, in one example, be operated manually by a user to recover recyclable build material from and/or to clean up a working area of the material management station 106.

Figure 2A:
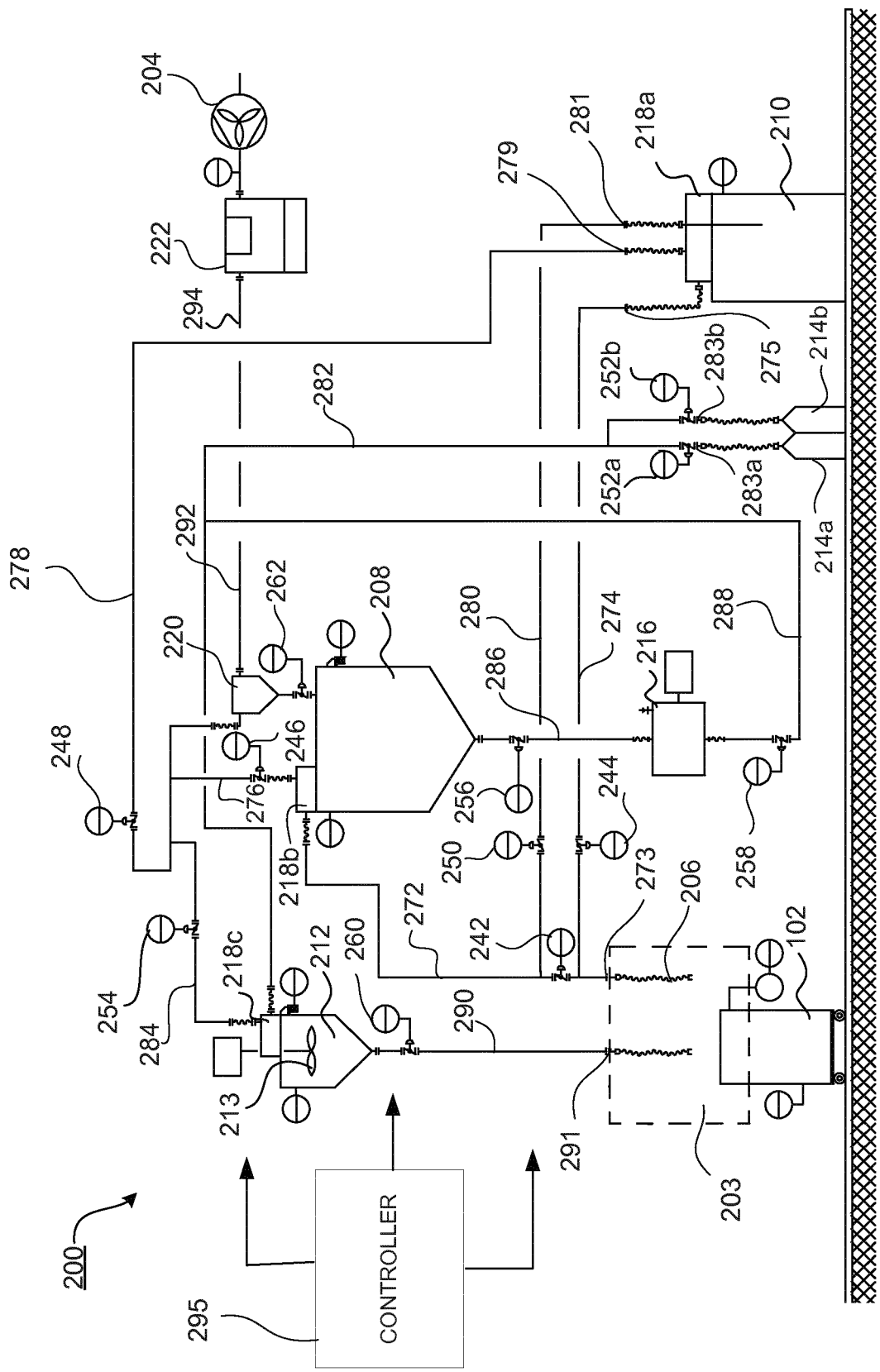
FIG. 2A schematically an internal circuit diagram of one example of a material management station.

FIG. 2A schematically illustrates an internal circuit diagram 200 of one example of a build material management system in the form of a material management station 106. The material management station 106 can be used in conjunction with the trolley 102 of FIG. 1A.

As previously described, printed parts along with unfused build material can be transported from the 3D printer 104 to the material management station 106 via the trolley 102. The material management station 106 can then be used to process build material and printed parts from the trolley 102.

In another example, printed parts along with unfused build material can be transported from the 3D printer 104 to the material management station 106 via another suitable container, e.g. a box or cartridge (not shown) instead of the trolley 102. The material management station 106 may then be used to process the powder-based material and printed parts from the container.

The material management station circuit 200 includes a conduit (or guide-channel) network and a pump 204 to provide a pressure differential across the conduit network to transport unfused build material between different components, as described below with reference to FIG. 2A. In this example, the pump 204 is a suction pump which operates to create a pressure differential across the suction pump to produce air flow from an air inlet at substantially atmospheric pressure through the conduit network towards an upstream side of the suction pump (at a pressure below atmospheric pressure or at "negative pressure"). The pump 204 may be provided as an integral part of the material management station 106 in one example, but in another example, the material management station 106 provides a negative/reduced pressure interface, via which a suction pump may be detachably coupled or coupled in a fixed configuration. Although the description below refers to first conduit, second conduit, third conduit, etc. of the conduit network, there is no implied ordering in the number of the conduits other than to distinguish one conduit from another.

A collection hose 206 is connected to a recovered build material tank (RBMT) 208 via a working area port in a working area 203 in the form of a working area inlet port 273 and a first conduit (hose-to-RBMT conduit) 272 of the conduit network. The recovered build material tank 208 includes a recovered build material tank (RBMT) inlet area comprising a recovered build material tank (RBMT) build material trap 218b and a recovered build material tank (RBMT) material outlet. The RBMT inlet area is where a fluidised flow of build material is received for storage in the recovered build material tank 208. The first conduit 272 provides a path between the working area inlet port 273 and the RBMT inlet area. The working area inlet port 273 is to receive build material from the collection hose 206 and is provided at an end of the first conduit 272 connected to the collection hose 206. In other examples, the RBMT inlet area may communicate directly with the working area 203 or the collection hose 206 without a first conduit 272 between.

The recovered build material tank 208 in this example is provided internally to the material management station 106. A hose-to-RBMT valve 242 is positioned along the first conduit 272 for opening and closing the path through the first conduit 272. The collection hose 206 extends from the working area inlet port 273 into the working area 203. The working area 203 includes at least a portion of the trolley 102 (or other container) and can be maintained at substantially atmospheric pressure. Build material from the trolley 102 can be collected by the collection hose 206 and transported to the recovered build material tank 208 through the first conduit 272. The recovered build material tank 208 can be used for storing any unfused build material from the trolley 102 that is suitable for being used again in a further 3D printing (additive manufacturing) process. In this way, the recovered build material tank 208 can be used as a buffer storage tank to temporarily store unfused build material prior to supplying the unfused build material for use in a further 3D printing (additive manufacturing) process.

A second conduit 274 (hose-to-overflow conduit) of the conduit network connects the collection hose 206 to an overflow tank 210. The overflow tank 210 includes an overflow inlet area and the second conduit 274 provides a path between the collection hose 206 and the overflow inlet area comprising, in this example, an overflow build material trap 218a (a filter). An overflow tank port in the form of an overflow tank outlet port 275 may also be provided at an end of the second conduit 274. The overflow tank 210 can be selectively sealed by an openable lid (not shown). In a sealed configuration, the overflow tank 210 is in fluid communication with one or more overflow inlet ports and overflow outlet ports of the conduit network. Furthermore, in the sealed configuration, the overflow tank 210 is not directly open to the atmosphere. Build material from the working area 203 can be transported through the second conduit 274 and overflow tank outlet port 275 into the overflow tank 210. A hose-to-overflow valve 244 is positioned along the second conduit 274 for opening and closing a path through the second conduit 274. Unfused build material from the trolley 102 (or other container) can be collected by the collection hose 206 and transported to the overflow tank 210 through the first conduit 272.

The overflow tank 210 is an external tank that is removable and that can be used for storing excess recoverable (recyclable) build material when the recovered build material tank 208 is full. Alternatively, the overflow tank 210 can be used as a waste storage tank to store unfused build material from the trolley 102 that is not suitable for recycling. In a further alternative, the overflow tank 210 can be used as a purged build material storage tank to store unfused build material from the trolley 102 and from elsewhere in the material management station 106 when the material management station 106 is purged of unfused build material.

The pump 204 is connected via a third conduit (pump-to-RBMT conduit) 276 of the conduit network to the recovered build material tank 208. The third conduit 276 provides a path between the pump 204 and the RBMT inlet area. A RBMT-to-pump valve 246 is positioned along the third conduit 276 for opening and closing the path through the third conduit 276.

The pump 204 is also connected to the overflow tank 210 via a fourth conduit (pump-to-overflow conduit) 278 of the conduit network. The fourth conduit 278 provides a path between the pump 204 and the overflow inlet area. An overflow tank port in the form of an overflow tank vacuum port 279 may also be provided at an end of the fourth conduit 278. Fluid, e.g. air, can transmit through the overflow tank vacuum port 279 from the overflow inlet area towards the pump 204. An overflow-to-pump valve 248 is positioned along the fourth conduit 278 for opening and closing a path through the fourth conduit 278.

Unfused build material in the trolley 102 can be collected using the collection hose 206 and transported either to the recovered build material tank 208 or to the overflow tank 210, or both. The tank to be used at a given time can be selected by opening appropriate valves along the conduits of the circuit of FIG. 2A.

The valves described herein with reference to FIG. 2A may be controlled by a controller 295, which may be, for example a programmable logic controller forming a part of processing circuitry of the build material management station 106. The controller 295 may electronically open one or more valves to open one or more paths in respective conduits based on the material transport operation being performed.

The controller 295 may also electronically close one or more valves to close one or more paths in respective conduits. The valves may be, for example, butterfly valves and may be actuated using compressed air. In another example, one or more valves may be opened and closed manually by a user.

The controller controls the general operation of the material management system 200. The controller may be a microprocessor-based controller that is coupled to a memory (not shown), for example via a communications bus (not shown). The memory stores machine executable instructions. The controller 295 may execute the instructions and hence control operation of the build material management system 200 in accordance with those instructions.

FIG. 2B is a table schematically illustrating for each of a number of different build material source locations and build material destination locations, an appropriate valve configuration corresponding the valves as labelled in FIG. 2A. A tick in an appropriate column of the table indicates that the corresponding valve is controlled to be open by the controller 295 for the particular build material transport operation. For example, when transporting build material from the recovered build material tank 208 to the mixing tank 212, the valves 256, 258 and 254 are set by the controller 295 to be open, whereas the valves 250, 244, 276, 248, 242, 262, 260, 252a and 252b are set to be closed. In alternative examples, some valves may be set to be open by simultaneity.

In an example, a recyclability indicator is determined by processing circuitry of the build material management station 106. The recyclability indicator can be indicative of whether the build material in the trolley 102 (or container) includes recyclable or recoverable material. When it is determined that the unfused build material in the trolley 102 is not recyclable or when the recovered build material tank 208 is full, the unfused build material can be transported to the overflow tank 210.

To transport the unfused build material from the trolley 102 (or container) to the overflow tank 210, the hose-to-overflow valve 244 in the second conduit 274 between the collection hose 206 and the overflow tank 210 and the overflow-to-pump valve 248 in the fourth conduit 278 between the pump 204 and the overflow tank 210 can be opened, e.g. electronically by the controller 295. When the pump is active, a differential pressure is provided from the pump to the collection hose 206. That is, a pressure at the pump 204 is lower than a pressure at the collection hose 206. The differential pressure enables build material from the trolley 102 (or container) to be transported to the overflow tank 210. Build material (and air) in proximity with an end of the collection hose 206 (at approximately atmospheric pressure) is transported from the collection hose 206, along the second conduit 274 and through the hose-to-overflow valve 244 to overflow tank 210. The overflow tank 210 is provided in the sealed configuration. At the overflow tank 210, build material separates from air flow and drops from the overflow inlet area into the overflow tank 210. Air (and any residual build material) continues along the fourth conduit 278 and through the overflow-to-pump valve 248 towards the pump 204, which is at a reduced pressure.

To help prevent unfused build material traveling through the overflow inlet area of the overflow tank 210 into the fourth conduit 278 towards the pump 204, the overflow inlet area can include an overflow build material trap 218a (e.g. a powder trap). The overflow build material trap 218a is arranged to collect build material from the second conduit 274 and divert the build material (e.g. powder) into the overflow tank 210. Thus, the overflow build material trap 218a helps prevent build material conveying past the overflow inlet area of the overflow tank 210 and entering the fourth conduit 278 via the overflow tank vacuum port 279 to travel towards the pump 204.

The overflow build material trap 218a may include a filter (e.g. a mesh), which collects build material transported from the overflow tank 210. Thus, the filter separates build material from air flow in the overflow inlet area. Holes in the filter are small enough to prevent the passage of at least 95% of build material but allow relatively free flow of air through the filter. Holes in the filter may be small enough to prevent the passage of at least 99% of build material, whilst still allowing relatively free flow of air through the filter. Build material collected by the filter may drop from the overflow inlet area into the overflow tank 210.

Recoverable unfused build material in the trolley 102 (or container) can be transported to the recovered build material tank 208 in a similar way. To transport the unfused build material from the trolley 102 to the recovered build material tank 208, the hose-to-RBMT valve 242 in the first conduit 272 between the collection hose 206 and the recovered build material tank 208 and the RBMT-to-pump valve 246 in the third conduit 276 between the pump 204 and the recovered build material tank 208 can be opened electronically by the controller 295 as described above. When the pump is active, a differential pressure is provided from the pump to the collection hose 206. That is, a pressure at the pump 204 is lower than a pressure at the collection hose 206. The differential pressure enables build material from the trolley 102 (or container) to be transported to the recovered build material tank 208. Build material (and air) in proximity with an end of the collection hose 206 (at approximately atmospheric pressure) is transported from the collection hose 206, along the first conduit 272 and through the hose-to-RBMT valve 242 to the recovered build material tank 208. At the recovered build material tank 208, build material separates from air flow and drops from the RBMT inlet area into the recovered build material tank 208. Air (and any residual build material) continues along the third conduit 276 and through the RBMT-to-pump valve 246 towards the pump 204, which is at reduced pressure relative to atmospheric pressure.

Figure 2C:
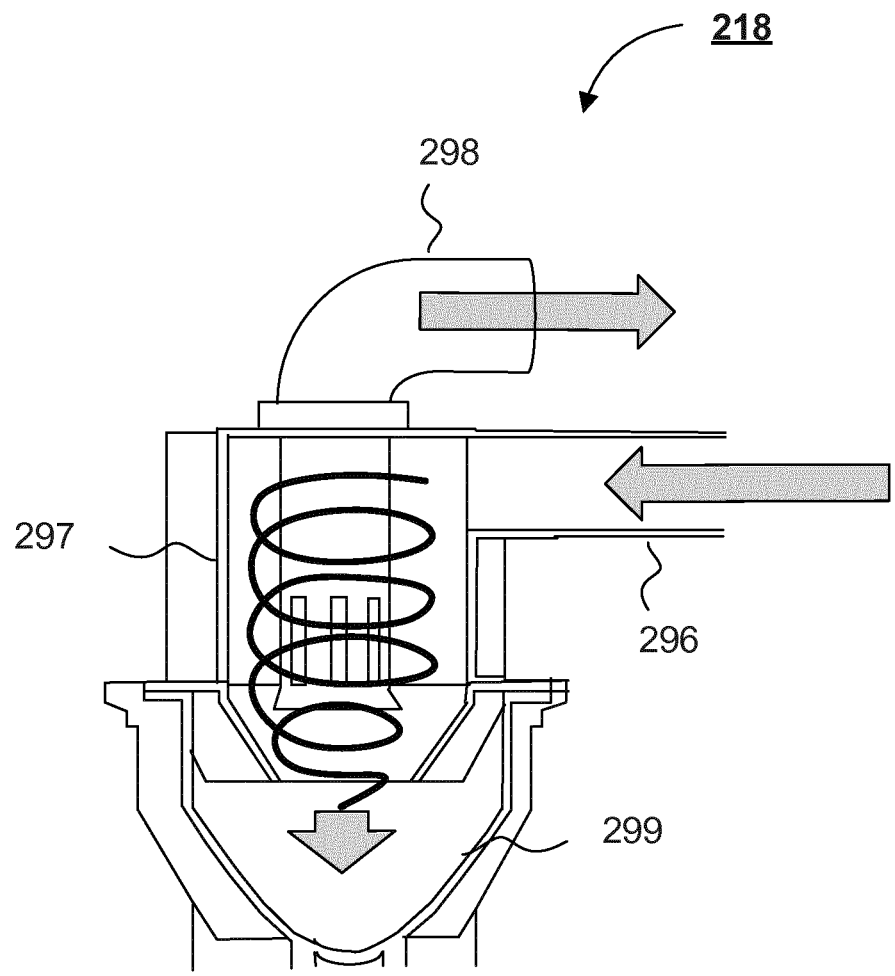
FIG. 2C schematically illustrates an example build material trap geometry used in tanks of the material management station internal circuit of FIG. 2A.

Each of the recovered build material tank 208, the overflow tank 210, and the mixing tank 212 has a build material trap 218b, 218a and 218c respectively. These build material traps 218a, 218b, 218c perform cyclonic filtration of an incoming fluidised flow of build material and air as schematically illustrated in FIG. 2C. An inlet 296 of the build material trap 218 receives the fluidised flow of build material and the build material is pushed by a centrifugal force created by suction of the pump 204 to an outer wall 297 of the build material trap 218. In one example, the outer wall 297 of the build material trap 218 has a circular cross-section and the incoming build material migrates via a cyclonic action to the outer wall 297 of the build material trap 218 until the incoming air reaches an exit below, whereupon the build material particles drop down into a vacuum sealed recipient 299 in the build material trap 218. Thus the build material trap 218 separates a fluidised flow of build material into a powder component, which is deposited in the associated tank and an air component, which is sucked towards the pump 204 via an air outlet 298 in the build material trap 218 providing an interface to the pump 204. A filter (not shown) may be provided in the air outlet 298 of the build material trap 218 to reduce the likelihood of any remaining build material reaching the pump 204 in the separated air flow. The build material trap 218 provides efficient powder separation via its geometry that promotes formation of a cyclone within the build material trap in use. It offers transportation of build material in an air flow and storage of the powder in a tank, whilst diverting an air flow out of the tank towards the pump 204. The build material trap provides a filter to capture residual powder in an air flow emerging from the cyclone to prevent it from reaching the pump 204. The build material trap 218 is one example of a build material filter having a function of separating an air from a build material flow at a corresponding tank inlet area. In other examples, the air flow is separated from the fluidised build material upon arrival at a destination tank using a filter other than a cyclonic filter. For example, a diffusion filter may be used.

Returning to FIG. 2A, the RBMT inlet area of the recovered build material tank 208 may also include the RBMT build material trap 218b (e.g. a powder trap) or another type of RBMT build material filter to separate build material and air from an incoming fluidised flow of build material. The RBMT build material trap 218b operates in the same or a similar way as the overflow build material trap 218a in the overflow tank 210, to help collect and divert build material into the recovered build material tank 208 to help prevent build material from traveling through the third conduit 276 towards the pump 204.

When collecting material from the trolley 102 via the collection hose 206, as described above, a user can move the end of the collection hose 206 around the working area 203 including the trolley 102 to collect as much build material from the trolley 102 as possible.

The recovered build material tank 208 is also connected via a fifth conduit (overflow-to-RBMT conduit) 280 of the conduit network. An overflow tank port in the form of an overflow tank inlet port 281 may also be provided at an end of the fifth conduit 280. Build material from the overflow tank 210 can be transported through the fifth conduit 280 and overflow tank inlet port 281 into the recovered material tank 208.

The fifth conduit 280 between the recovered material tank 208 and the overflow tank inlet port 281 includes an overflow-to-RBMT valve 250 in the path leading to the RBMT build material trap. In the event that the recovered build material tank 208 needs to be refilled with recovered build material, the overflow-to-RBMT valve 250 in the fifth conduit 280 between the recovered build material tank 208 and the overflow tank 210 can be opened, along with the RBMT-to-pump valve 246 in the third conduit 276 between the recovered build material tank 208 and the pump 204. Each of the valves can be opened electronically by the controller 295, as described above. When the pump is active, a differential pressure is provided from the pump to the overflow tank 210. That is, a pressure at the pump 204 is lower than a pressure at the overflow tank 210. In this example, the overflow tank 210 is provided in an unsealed configuration and includes an air inlet (not shown) open to atmosphere to maintain approximately atmospheric pressure within the overflow tank 210. The differential pressure enables build material from the overflow tank 210 to be transported to the recovered build material tank 208. Air flows into the overflow tank 210 through the air inlet. Build material (and air) in the overflow tank is transported from the overflow tank 210, along the fifth conduit 280 and through the overflow-to-RBMT valve 250 to the recovered build material tank 208. At the recovered build material tank 208, build material separates from air flow and drops from the RBMT inlet area into the recovered build material tank 208. Air (and any residual build material) continues along the third conduit 276 and through the RBMT-to-pump valve 246 towards the pump 204, which is at a reduced pressure.

The material management station circuit 200 also includes a mixing tank 212. The mixing tank 212 can be used to mix recovered build material from the recovered build material tank 208 with fresh build material from a fresh build material supply tank 214a or 214b, ready to be used in a 3D printing process.

Although two fresh build material supply tanks 214a, 214b are shown in this example, in other examples, one or more fresh build material supply tanks 214a, 214b may be used. More fresh build material supply tanks 214a, 214b may be used when appropriate.

Each fresh build material supply tank 214a, 214b is connected to the mixing tank 212 via a sixth conduit (a fresh build material conduit) 282 of the conduit network and a fresh build material supply tank port 283a, 283b. The fresh build material supply tank port 283a, 283b is to output build material from the respective fresh build material supply tank 214a, 214b. Each fresh build material supply tank 214a, 214b has an associated material supply tank cartridge-to-mixer valve 252a, 252b in the sixth conduit 282 between the respective fresh build material supply tank 214a, 214b and the mixing tank 212. Each fresh build material supply tank 214a, 214b also includes an air inlet valve whereby to ensure air can enter the fresh build material supply tanks 214a, 214b to maintain air pressure within the fresh build material supply tanks 214a, 214b at approximately atmospheric pressure.

The mixing tank 212 is connected via a seventh conduit (pump-to-mixer conduit) 284 of the conduit network to the pump 204. The seventh conduit 284 between the mixing tank 212 and the pump 204 includes a mixer-to-pump valve 254, which may be opened or closed to open and close the passage through the seventh conduit 284.

To transport fresh build material from the fresh build material supply tank 214a or 214b to the mixing tank 212, the material supply tank cartridge-to-mixer valve 252a or 252b and the mixer-to-pump valve 254 in the seventh conduit 284 between the mixing tank 212 and the pump 204 are opened. Each of the valves can be opened electronically by the controller 295, as described above. When the pump 204 is active, a differential pressure is provided from the pump 204 to the fresh build material supply tank 214a or 214b. That is, a pressure at the pump 204 is lower than a pressure at the fresh build material supply tank 214a or 214b. The differential pressure enables build material from the fresh build material supply tank 214a or 214b to be transported to the mixing tank 212. Build material (and air) in the fresh build material supply tank 214a or 214b is transported from the fresh build material supply tank 214a or 214b, along the sixth conduit 282 and through the cartridge-to-mixer valve 252a or 252b to the mixing tank 212. At the mixing tank 212, build material separates from air flow and drops from the mixer inlet area into the mixing tank 212. Air (and any residual build material) continues along the seventh conduit 284 and through the mixer-to-pump valve 254 towards the pump 204, which is at a reduced pressure.

The mixer inlet area of the mixing tank 212 can also include a mixer build material trap 218c (e.g. a powder trap) or any type of mixer build material filter to separate an air flow from a build material flow, which operates in the same or similar manner to as the overflow build material trap 218a and the RBMT build material trap 218b. The mixer build material trap 218c helps to collect and divert build material into the mixing tank 212, and help prevent the build material from travelling through the seventh conduit 284 towards the pump 204.

The mixing tank 212 is also connected to the recovered build material tank 208 via an eighth conduit (RBMT-to-mixer conduit) 286 of the conduit network and a ninth conduit 288 of the conduit network extending sequentially from the recovered build material tank 208 to the mixing tank 212. The ninth conduit 288 may be part of the RBMT-to-mixer conduit 286.

A sieve 216 may, in some examples, be located in the RBMT to mixer conduit 286 or between the eighth and ninth conduits 286 and 288 between the recovered build material tank 208 and the mixing tank 212. The sieve 216 may be used to separate agglomerates and larger parts of material from the recycled or recovered build material that is transported from the recovered build material tank 208. Often, agglomerates and larger parts of material are not suitable for recycling in a further 3D printing process, so the sieve may be used to remove these parts from the build material. The sieve 216 includes an air inlet (not shown) to ensure air can enter the sieve 216 to maintain air pressure within the sieve 216 at approximately atmospheric pressure. In some examples, the RBMT-to-mixer conduit 286 may not be connected to a build material outlet of the recovered build material tank 208. In other examples a conduit connecting an outlet of the recovered build material tank 208 to a build material inlet in the mixer build material trap 218c of the mixing tank 212 may form a closed circuit.

A RBMT-to-sieve valve 256 is located in the eighth conduit 286 between the recovered build material tank 208 and the sieve 216, and a sieve-to-mixer valve 258 is located in the ninth conduit 288 between the sieve 216 and the mixing tank 212. The RBMT-to-sieve valve 256 and sieve-to-mixer valve 258 may be opened or closed to open and close the passages through the eighth and ninth conduits 286, 288 between the recovered build material tank 208 and the mixing tank 212. The valves may be opened or closed electronically by the controller 295.

To transport build material from the recovered build material tank 208 to the mixing tank 212 both the RBMT-to-sieve valve 256 and the sieve-to-mixer valve 258 in the eighth and ninth conduits 286, 288 between the recovered build material tank 208 and the mixing tank 212 can be opened as well as the mixer-to-pump valve 254 in the seventh conduit 284 that connects the mixing tank 212 to the pump 204. Build material in the recovered build material tank 208 may drop down into the sieve 216 through the eighth conduit 286 by gravity, for example. When the pump 204 is active, a differential pressure is provided from the pump 204 to the sieve 216. That is, a pressure at the pump 204 is lower than a pressure at the sieve 216. The differential pressure enables build material from the recovered build material tank 208 to be transported to the sieve 216 by gravity and to the mixing tank 212 by suction. Build material in the recovered build material tank 208 is transported through the RBMT material outlet, along the eighth conduit 286 and through the RBMT-to-sieve valve 256 to the sieve 216. Build material (and air) in the sieve 216 is transported from the sieve 216, along the ninth conduit 288 and through the sieve-to-mixer valve 258 to the mixing tank 212. At the mixing tank 212, build material separates from air flow and drops from the mixer inlet area into the mixing tank 212. Air (and any residual build material) continues along the seventh conduit 284 and through the mixer-to-pump valve 254 towards the pump 204, which is at a reduced (negative) pressure.

A currently selected ratio of recycled build material from the recovered build material tank 208 and fresh build material from the fresh build material supply tank 214a or 214b can be transported to the mixing tank 212 as described above. The ratio of fresh build material to recovered build material may be any selected ratio. The ratio may depend on the type of build material and/or the type of additive manufacturing process. In a selective laser sintering process the ratio could be, for example 50% fresh to 50% recovered build material. In one example of a printhead cartridge 3D printing process, the ratio may be 80% recovered to 20% fresh build material. For some build materials 100% fresh build material may be used, but for other build materials up to 100% recovered build material may be used. The fresh build material and the recovered build material can be mixed together within the mixing tank 212 using, for example, a rotating mixing blade 213.

Once the fresh build material and the recovered build material are sufficiently mixed, the mixed build material can be transported from the mixing tank 212 through a mixer-to-trolley valve 260, a tenth conduit (mixer-to-trolley conduit) 290 of the conduit network, a working area port in the form of a working area outlet port 291, to the working area 203 and into the trolley 102. Build material from the mixing tank 212 can pass through the working area outlet port 291 into the working area 203. The trolley 102 (or container) can be located substantially beneath the mixing tank 212 so that gravity can aid the transport of mixed build material from the mixing tank 212, through the mixer-to-trolley valve 260, the tenth conduit 290, the working area outlet port 291 and the working area 203 to the trolley 102.

Once the trolley 102 is filled with enough build material for a given 3D print run, the trolley 102 can be returned to the 3D printer 104. An appropriate quantity of build material to fill the trolley 102 for a print job may be controlled by the controller 295 of the material management station 106 based on the material management station 106 sensing how much build material is in the trolley when the trolley is docked in the material management station 106 at the beginning of a trolley fill workflow. The controller may then fill the trolley with a particular quantity (dose) of build material requested by a user for a particular print job intended by the user. The dosing is achieved by using a fill level sensor (not shown) such as a load cell in the mixing tank 212 to output a fill level value indicative of an amount of non-fused build material in the mixing tank. The fill level sensor can be one or more load cells, or any other type of sensor such as a laser-based sensor, a microwave sensor, a radar, a sonar, a capacitive sensor, etc. When the fill level sensor is a load cell, the fill level value can be an electrical signal indicative of a mass of the non-fused build material in the storage container.

A number of different workflows may be implemented in the material management station 106. These workflows are managed by the user, but some level of automation may be provided by a data processor on the material management station 106. For example, the user may select a workflow from a digital display on the material management station 106. For users having one material management station 106 and one printer 104 an example workflow cycle may be filling the trolley 102, followed by printing a 3D object, followed by unpacking the object from a build volume in the material management station 106 followed by a subsequent print operation and a corresponding unpacking of the build volume and so on. However, the material management station 106 may serve two or more printers so that successive unpacking and trolley filling operations may be performed by the material management station 106. The user may also choose to perform the trolley filling, printing and unpacking functions in a random order.

For each of the workflow operations, a user interface of the material management station 106 may guide the user to undertake particular manual operations that may be performed as part of the workflow operation. For example, to perform an unpack operation, the user interface may instruct the user to move the collection hose 206 around the collection area 203 as described previously. In addition, the material management station 106 can automatically initiate other functions of the workflow operation. For example, to perform the unpack operation, the material management station 106 can automatically operate the pump 204 whilst the user moves the collection hose 206 around the collection area 203 to recover build material from the trolley 102. Any workflow operations the material management station 106 can perform fully automatically may be signalled to the user through the user interface without requiring user confirmation to proceed. If the workflow operation could present a potential safety risk, the otherwise fully automatic workflow operation may require user confirmation to proceed.

For example, to load the trolley 102 with build material, the user sets this workflow operation then the material management station 106 automatically launches the different operations required sequentially. The material management station 106 is controlled to send build material from the recovered build material tank 208 to the mixing tank 212. The material management station 106 is further controlled to send fresh build material from at least one of the fresh build material supply tanks 214a, 214b to the mixing tank 212. The material management station 106 is subsequently controlled to blend the mixture in the mixing tank 212. The mixed build material in the mixing tank 212 can then be discharged to the trolley 102. In an example, this workflow operation is completed as a batch process, and so the cycle may be continuously repeated to completely fill the trolley 102.

In some processes, a small portion (e.g. 1%) of build material can pass through the build material traps 218a, 218b, 218c (e.g. the powder traps) and can travel towards the pump 204.

An additional RBMT build material trap 220 (e.g. a powder trap) may, in some examples, be located in an eleventh conduit (pump feed conduit) 292 of the conduit network that connects each of the third, fourth and seventh conduits 276, 278 and 284 to the pump 204. The additional RBMT build material trap 220 is connected to the RBMT inlet area. The additional RBMT build material trap 220 collects build material that may have passed through any of the overflow build material trap 218a, RBMT build material trap 218b or mixer build material trap 218c to help prevent it from reaching the pump 204. Build material collected in the additional RBMT build material trap 220 can be transported into the recovered build material tank 208 by opening a trap-to-RBMT valve 262. The trap-to-RBMT valve 262 may be opened electronically by the controller 295. The RBMT build material trap 220 may operate in the same or similar way to each of the overflow, RBMT, and mixer build material traps 218a, 218b and 218c. Build material can be transported from the RBMT build material trap 220 to the recovered build material tank 208 by gravity.

A pump filter 222 may also be located in a twelfth conduit 294 of the conduit network adjacent the pump 204. This pump filter 222 helps to collect any build material that may have passed through any of the overflow build material trap 218a, RBMT build material trap 218b or mixer build material trap 218c as well as the additional RBMT build material trap 220. This helps prevent the build material from reaching the pump 204, thereby reducing the likelihood of the function of the pump 204 being impaired, which could happen if large quantities of build material were to reach it.

At any time, when the material management station 106 is to be used to process build material of a different material type, for example of a different material, the material management station circuit 200 can be controlled to implement a purging process to purge substantially all build material of a current material type from the material management station circuit 200 to the overflow tank 210. The fresh build material supply tanks 214a, 214b can be disconnected from the build material station circuit 200 and stored to prevent wastage of fresh building material of the current material type.

In one example, the purging process is carried out when unfused build material in the trolley 102 has already been collected using the collection hose 206 and transported either to the recovered build material tank 208 or to the overflow tank 210, or both. Alternatively, the purge process can include using the collection hose 206 to transport any unfused build material in the trolley 102 to the overflow tank 210, as described previously.

The purge process includes transporting any unfused build material in the recovered build material tank 208 to the overflow tank 210. To transport unfused build material from the recovered build material tank 208 to the overflow tank 210, the RBMT-to-sieve valve 256 and the sieve-to-mixer valve 258 in the eighth and ninth conduits 286, 288 between the recovered build material tank 208 and the mixing tank 212 can be opened as well as the mixer-to-trolley valve 260 in the tenth conduit 290 and the hose-to-overflow valve 244 in the second conduit 274 between the collection hose 206 and the overflow tank 210 and the overflow-to-pump valve 248 in the fourth conduit 278 between the pump 204 and the overflow tank 210. Any build material in the recovered build material tank 208 drops down into the sieve 216 through the eighth conduit 286 by gravity. The collection hose 206 can be connected directly to the tenth conduit 290 before or after any cleaning of the unfused build material in the trolley 102 has been completed. When the pump 204 is active, a differential pressure is provided from the pump 204 to the sieve 216 via the overflow-to-pump valve 248, the overflow tank 210, the hose-to-overflow valve 244, the collection hose 206, the mixer-to-trolley valve 260, the mixing tank 212 and the sieve-to-mixer valve 258. Build material in the recovered material tank 208 is transported to the sieve 216 by gravity via the eighth conduit 286 and the RBMT-to-sieve valve 256. That is, a pressure at the pump 204 is lower than a pressure at the sieve 216. The differential pressure enables build material from the recovered build material tank 208 to be transported to the sieve 216 and on to the overflow tank 210. At the overflow tank, build material separates from air flow and drops from the overflow inlet area into the overflow tank 210. Air (and any residual build material) continues along the fourth conduit 278 and through the overflow-to-pump valve 248 towards the pump 204, which is at a reduced pressure. It can be seen that any unfused build material in the sieve 216, the mixing tank 212 or in any of the eighth conduit 286, the ninth conduit 288, the tenth conduit 290 or the second conduit 274 may also be transported to the overflow tank 210. In this way, substantially all unfused build material in the material management station circuit 200 can be transported to the overflow tank 210.

Alternatively, the unfused build material in the recovered build material tank 208 can be transported to the trolley 102 as described previously. Subsequently, the unfused build material in the trolley 102 can be transported to the overflow tank 210, also as described previously. Thus, an alternative way to transport unfused build material from the recovered build material tank 208 to the overflow tank 210 can be provided without directly connecting the collection hose 206 to the tenth conduit 290.

The purge process can also include one or more further purging process elements where a sacrificial material is transported through any part of the conduit network of the material management station circuit 200 which may still contain at least an amount of unfused build material of a current material type. The sacrificial material can act to dislodge at least some of the current build material remaining in the material management station circuit 200. The sacrificial material in one example may be the build material of the different build material type to be subsequently used in the material management station 106. The sacrificial material may alternatively be an inert material (e.g., silica) which is not a build material. In this way, any small amount of sacrificial material remaining in the material management station 106 at the end of the purging process is unlikely to interfere with the further operation of the material management station 106.

After the purge process is completed, and substantially all the unfused build material in the material management station circuit 200 is in the overflow tank 210, the overflow tank 210 can then be removed from the material management station 106, for example for storage or disposal and a further overflow tank (not shown) can be connected to the material management station 106. The further overflow tank can be empty or the further overflow tank can contain build material previously purged from the (or another) material management station 106.

The purge process can be performed in response to a user input, or automatically. Where purging is performed automatically, the material management station circuit 200 can be controlled to implement the purging process when a trolley 102 containing a different material is slotted into the docking position 107 in the material management station 106. In this example, a material type is electronically recorded on a memory chip of the trolley 102 (or other container). The memory chip is readable by the processing circuitry of the material management station 106 to determine the material type of the material in the trolley 102 (or other container). Alternatively or additionally, the material management station circuit 200 can be controlled to implement the purging process when one or more fresh build material supply tanks 214a, 214b containing a different material type are connected to the material management station circuit 200. In this example, a material type is electronically recorded on a memory chip of the fresh build material supply tanks 214a, 214b. The memory chip is readable by the processing circuitry of the material management station 106 to determine the material type of the material in the fresh build material supply tanks 214a, 214b. In other examples, the material management station circuit 200 can be controlled to implement the purging process when both fresh build material supply tanks 214a, 214b are removed from the material management station circuit 200. It will be appreciated that the material management station 106 may be controlled to provide an indication to a user that the purging process can be performed based on the criteria discussed previously.

Figure 3:
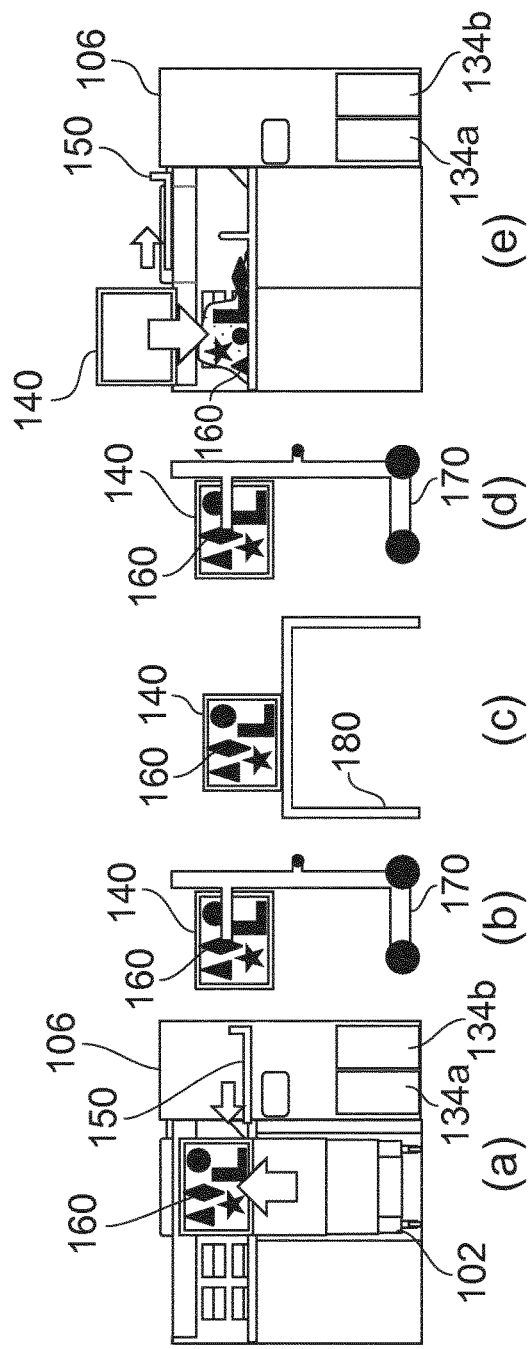
FIG. 3 shows an example of the natural cooling process.
Figure 4:
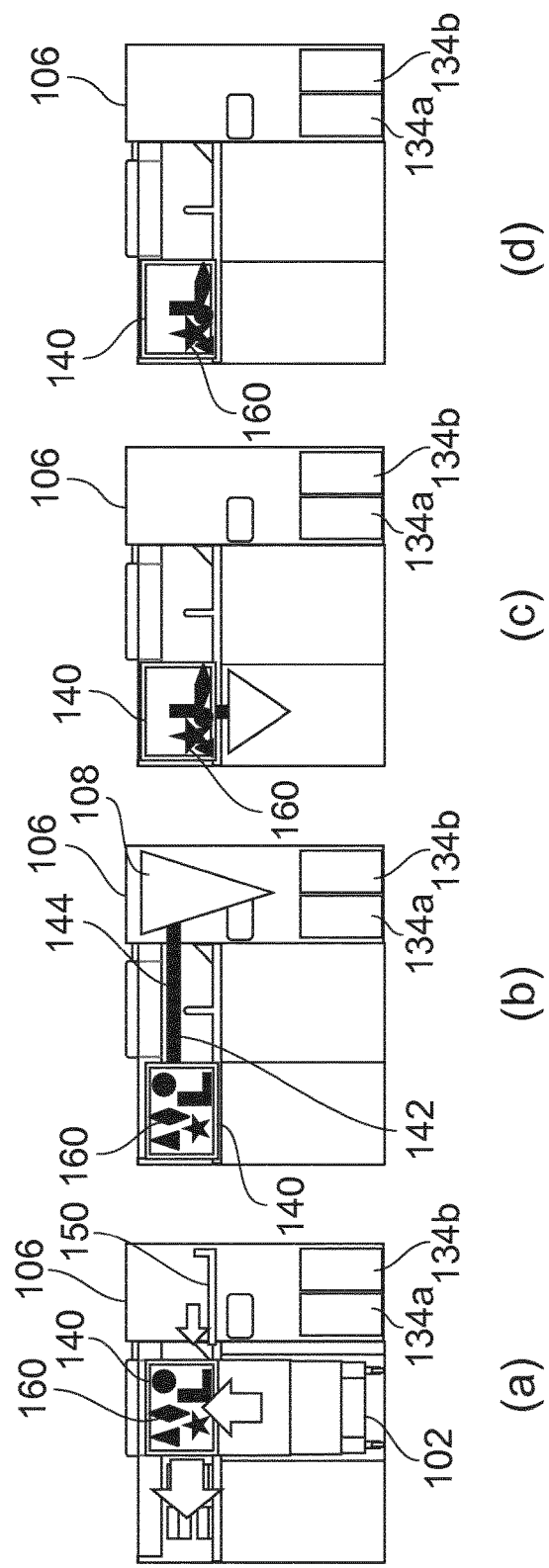
FIG. 4 shows an example of the fast cooling process.

In order to improve efficiency of the overall 3D printing system, it is beneficial to provide a container 140 for cooling and unpacking manufactured objects 160 as shown in FIGS. 3 and 4. The container 140 is separate from the trolley 102 and use of the container 140 allows the trolley 102 to be used for another print job to print subsequent manufactured objects while the manufactured objects 160 contained in the container 140 are cooled and unpacked in the container 160 independently from the trolley 102.

The container 140 is used alongside the 3D printing system 100. The container 140 is used with the trolley 102 to provide an improved throughput of manufactured objects 160 since the container 140 is distinct from the trolley 102. A user may have a number of containers 140 at his or her disposal because the container 140 is a less expensive device than the trolley 102. As such, manufactured objects 160 may be cooled and unpacked from the container 140 while the trolley is re-used to manufacture more objects 160.

FIG. 3 shows how the container 140 is used to facilitate low cost natural cooling while relieving trolley 102 of the print jobs. In some implementations, low cost natural cooling can take approximately thirty hours. In FIG. 3(a), the container 140 is positioned over the manufactured objects 160 on the printing platform of the trolley 102. A guillotine member 150 is inserted into the container 140 to form a base of the container 140 with the manufactured objects 160 located inside the container 140.

In FIG. 3(b), a transporter 170 grabs the container 140 from the trolley 102 and transports the container to a cooling table 180. The container 140 can then be left on the cooling table 180 for the manufactured objects 160 to cool naturally. Multiple containers 140 may be placed on the cooling table 180 for natural cooling.

Once the manufactured objects have cooled down, the transporter 170 collects the container from the cooling table and takes it back to the 3D printing system 100 as shown in FIGS. 3(d) and 3(e). At this stage the container 140 is unpacked and any unused build material is collected and recycled in the material management system 106. Unpacking is performed by removing the guillotine member 150 from the container 140 to release the manufactured objects and any unused build material.

FIG. 4 shows how the container 140 is used to cool and unpack the manufactured objects in the 3D printing system 100. In FIG. 4(a), the container 140 is positioned over the manufactured objects 160. The guillotine member 150 can be slid into or otherwise received by the container 140 so as to provide a base for the container 140 and prevent the manufactured objects 160 from falling out of the container 140.

In FIG. 4(b), the container 140 is cooled using a vacuum source 144 connected to the container via a connector 142. The vacuum source 144 applies a variable vacuum in the container 140 to facilitate cooling while preventing damage to the manufactured objects 160. Unused build material may be suctioned from the container via the vacuum source and stored in the internal recovered build material tank 108 in the material management system 106.

In FIG. 4(c), the container 140 is vibrated to unpack the manufactured objects and remove unused build material. During the vibration stage, unused build material may be collected and stored in the internal recovered build material tank 108.

In FIG. 4(d), the manufactured objects 160 may be bead blasted in the container 140 to clean the manufactured objects 160.

Figure 5:
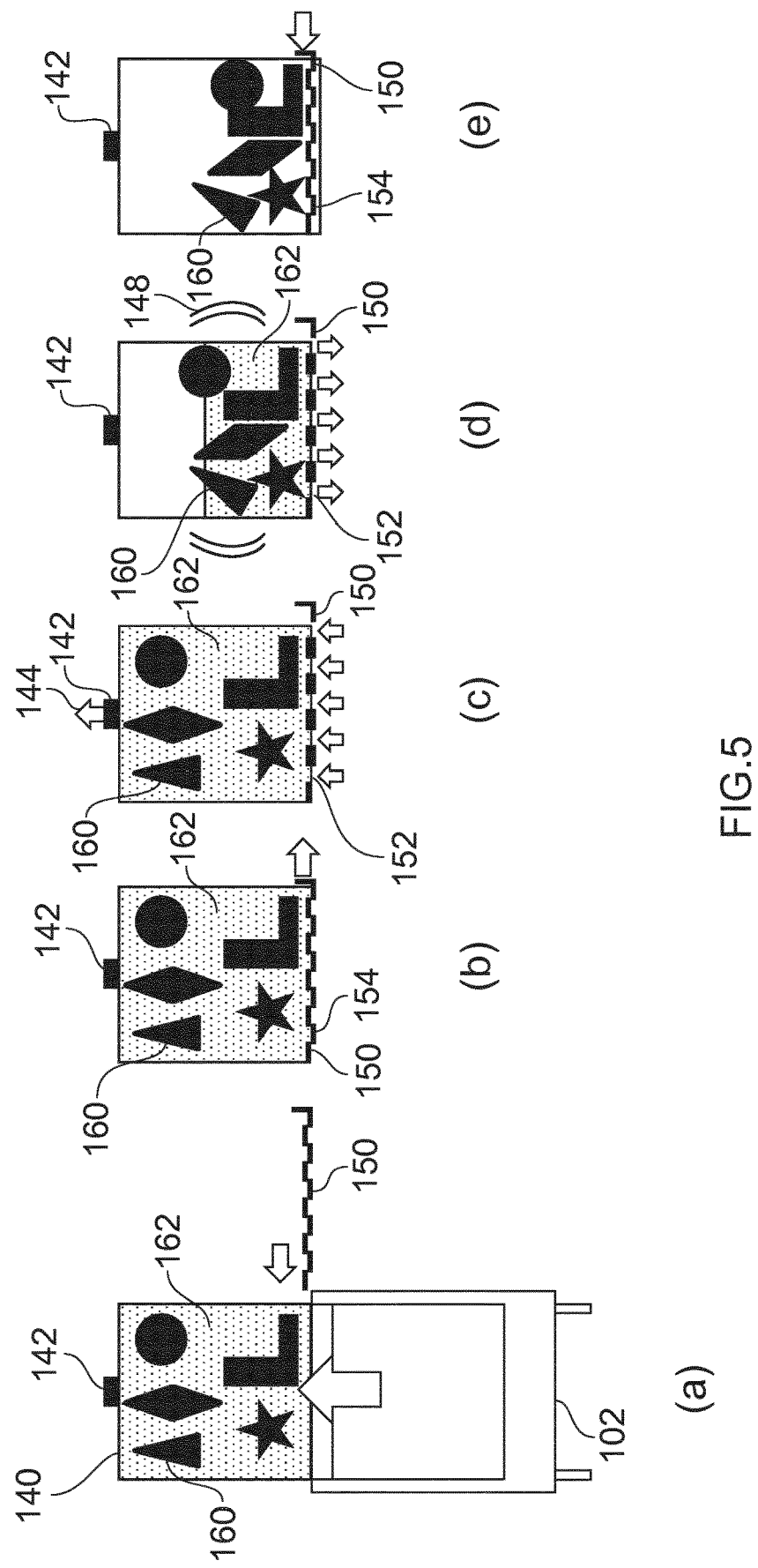
FIG. 5 shows an example of the trolley and container.

FIG. 5 shows the container in more detail. The container 140 is provided for receiving a manufactured object 160 from the 3D printer. The container 140 includes a wall forming the sides of the container 140, a top or cooling lid extending to the sides of the container and a connector 142 for connection to a vacuum source (not shown). The container 140 may be any shape, and the wall of the container may be shaped to complement the other components in the 3D printing system. In particular, in one example the container is substantially cuboid shaped. The container 140 is positioned on the trolley 102 and therefore the base of the container 140 is compatible with the build platform of the trolley 102.

In one example, the connector 142 is located in the upper portion of the container 140. In another example, the connector 142 is disposed on the wall of the container 140, or alternatively in the top of the container 140. The connector 142 provides a means of connecting the container 140 to a vacuum source such as a pneumatic pump or a vacuum pump, or a suction pump. The vacuum source can be controlled so as to provide ideal conditions inside the container 140 for cooling manufactured objects 160 located inside the container 140. The vacuum source may provide a partial vacuum.

The container 140 is provided with a guillotine member 150. The lower portion of the container 140 is provided with support members (not shown) such as runners or channels to receive the guillotine member 150 to form a base of the container 140. Other means for receiving the guillotine member 150 are also envisaged. A simple flange structure in the lower portion of the container 140 may provide sufficient support for the guillotine member 150.

In FIG. 5(a), the container 140 is positioned on the trolley 102 so that the container contains the manufactured objects 160 and any unused build material 162. The guillotine member 150 is then moved so as to slide between the trolley 102 and the lower portion of the container 140 to provide a base for the container 140. In this step, the manufactured objects 160 are transferred to the container 140.

The guillotine member 150 is selectively adjustable between an apertured configuration and a closed configuration as shown in FIGS. 5(b) and 5(c). In the closed configuration shown in FIGS. 5(b) and 5(e), the guillotine member 150 is provided with a closure by way of a plurality of through holes 152 are closed so as to prevent build material 162 and/or manufactured objects 160 from falling out of the container 140. In the apertured configuration shown in FIGS. 5(c) and 5(d), the guillotine member has a plurality of through holes to allow passage of air and/or build material.

The guillotine member 150 may be partially opened in the apertured configuration and the container 140 may be connected to the vacuum source 144 via the connector 142.

A controlled vacuum may be applied to the container 140 to cool down the manufactured objects 160. Unused build material 162 may be recovered and collected by the vacuum 144 and stored in the material management system 106.

Once the manufactured objects 160 have been cooled, the container 140 may be vibrated to unpack the manufactured parts 160.

The container 140 may be further provided with clamp points (not shown) such as hooks or loops. The clamp points are able to receive a clamp arm (not shown) from the 3D printer system 100 so that the container may be vibrated. Vibrating the manufactured objects 160 improves unpacking of the manufactured objects 160 and enables excess build material 162 to be recycled by collecting it from the container 140. A clamp arm in a printer system 100 is provided with a vibration mechanism 148 for vibrating the container 140.

Alternatively, the container 140 may be provided with a vibrator for self-vibration of the manufactured objects 160 inside the container 140.

In one example, the guillotine member 150 is formed from at least two sheets of material. The materials may be mesh-like to provide a plurality of holes 152 over the entire surface of the guillotine member 150. In another example, the material may be formed from a continuous sheet with a number of punched out holes 152. The location of the holes 152 may be chosen so as to facilitate cooling of the manufactured objects 160.

In another example, air holes may be provided in the wall of the container. Such air holes may be provided with doors, covers or filters so as to only allow the passage of air when desired and to prevent inadvertent build material spillage. Air holes in the wall of the container may provide an alternative to the holes of the guillotine and a guillotine without any holes may be provided.

The guillotine member 150 may be arranged such that the plurality of holes 152 may be partially opened. Controlling the hole size provides another method for controlling the flow of air passing through the container 140 while the vacuum source is connected to the connector 142 and active.

In one example the guillotine member 150 is formed from a number of apertured sheets. When the apertures are aligned, the guillotine member 150 is in the apertured configuration and when the apertures are not aligned, the guillotine member 150 is in the closed configuration.

Figure 6:
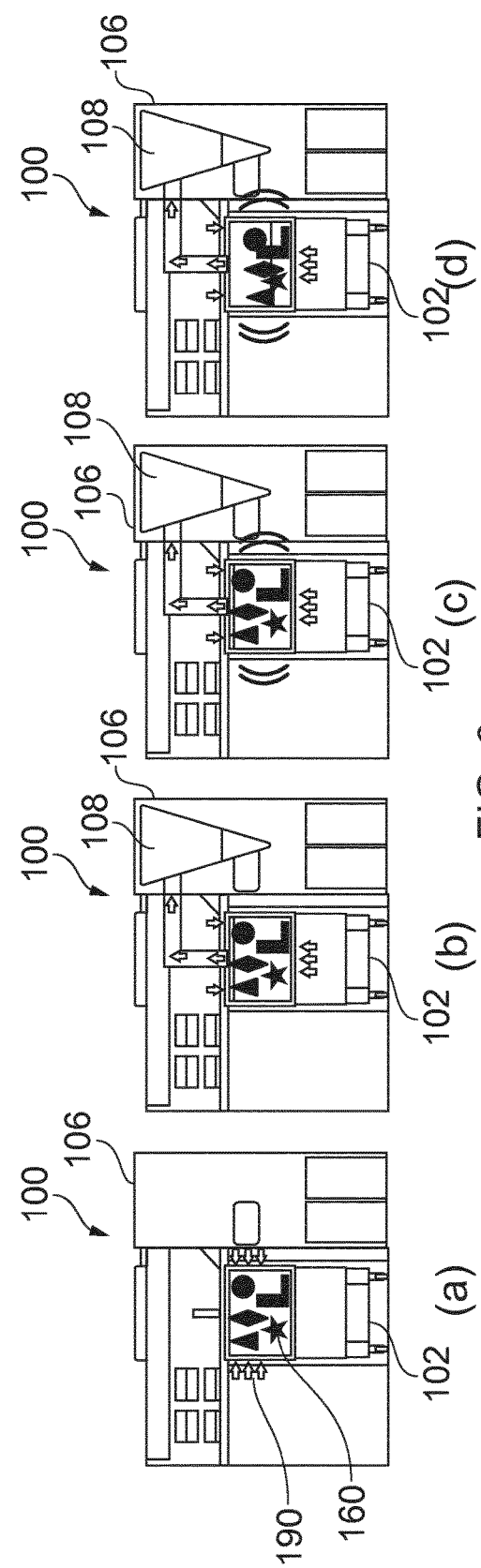
FIG. 6 shows another example of the fast cooling process.

FIG. 6 shows an example of the fast cooling process carried out inside the trolley 102. In FIG. 6(*a*), heaters 190 are provided to anneal the manufactured objects 160 in the container 140.

A heater 190 may be provided in the container so that annealing of the manufactured objects 160 may be carried out in the container 140.

A portion of the wall, the top or the base of the container 140 may be provided with a heating element 190, heat transfer plate or thermal blankets to facilitate the annealing process.

In FIG. 6(*b*), the guillotine member 150 is at least partially opened into the apertured configuration and the vacuum is connected to the connector 142 to create an air flow through the container 140. The vacuum sucks up unused build material and directs the unused build material to the recycle tank 108 in the material management system 106. Recycled build material may be used for subsequent print jobs. The vacuum may initially be gentle in order to slowly reduce the temperature without affecting the manufactured objects 160.

In FIG. 6(*c*), the container 140 is vibrated. This may be achieved by vibrating the container 140 externally or with an internal vibrator. Alternative, a pulsed vacuum may provide vibrations. Vibrations can create internal cracks in the unfused build material to enhance heat and unused build material extraction.

In FIG. 6(*d*), at a predetermined container temperature, or after a certain amount of cooling time, a strong vacuum is applied to the container to enhance temperature reduction and build material unpacking. This can be combined with vibration and/or pulsed vacuum to increase performance.

Figure 7:
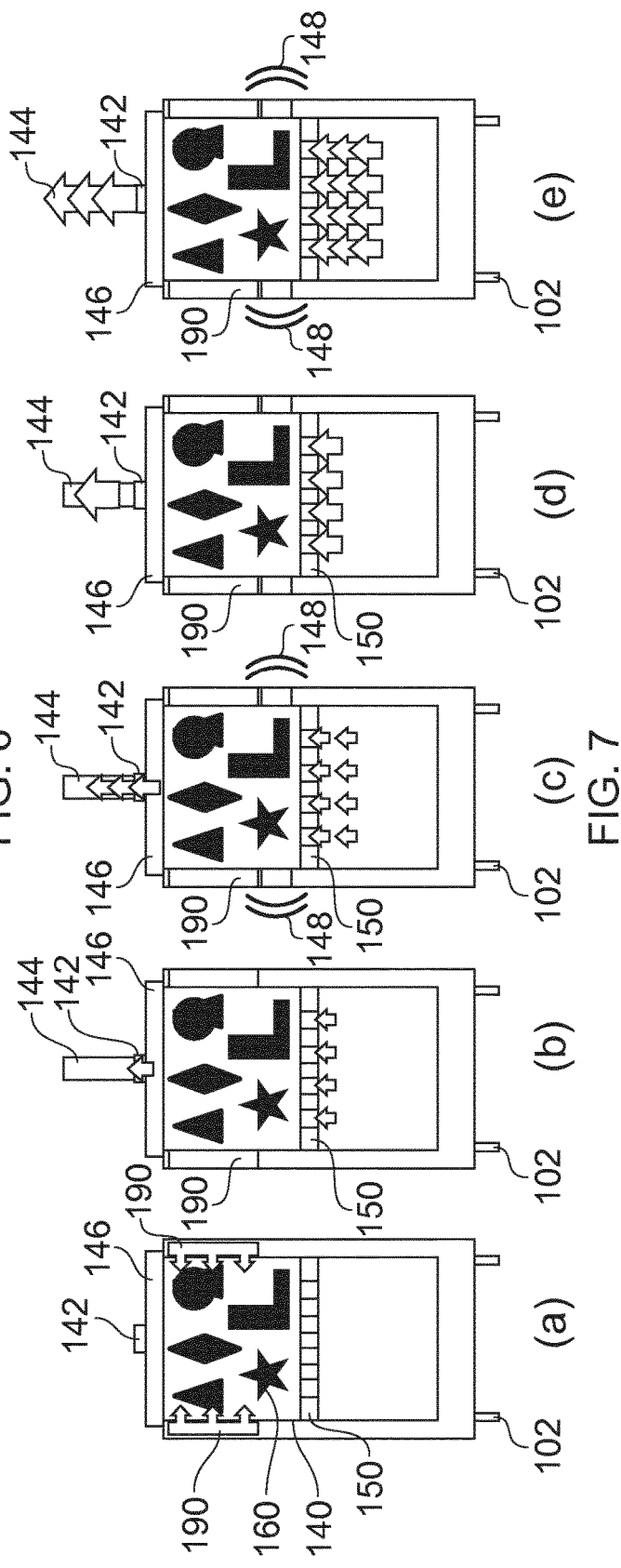
FIG. 7 shows another example of the trolley and the container.

FIG. 7(*a*) to (*e*) shows the fast cooling process within the trolley 102. Once the manufactured objects 160 have been printed, the trolley 102 is transferred to the material management system 106. The manufactured objects 160 are then transferred into the container 140 using the same method as previously described. The container 140 is coupled with heaters 190 and a connector 142 in the top or cooling lid 146 of the container 140. The guillotine member 150 is partially opened so allow air and build material to pass through while retaining the manufactured objects 160 in the container 140 and a vacuum source is connected to the connector 142. The vacuum collects unused build material for secondary use. Vibrators, increased suction and a combination of vibrations and increased suction are used to cool and unpack the manufactured objects 160.

The container 140 is used along-side the 3D printing system 100. The container 140 is used with the trolley 102 to provide an improved throughput of manufactured objects 160 since the container 140 is distinct from the trolley 102. A user may have a number of containers 140 are his or her disposal because the container 140 is a less expensive device compared to the trolley 102. As such, manufactured objects 160 may be cooled and unpacked from the container 140 while the trolley 102 is re-used to manufacture more objects.

A benefit of the container 140 is that use of the container 140 allows the trolley 102 to be used for a subsequent print job while providing a space for cooling and unpacking of the print job. A further benefit of the container 140 is that build material cannot escape from the container 140 when the guillotine member 150 is in the closed configuration. Moving the manufactured objects 160 from the trolley 102 in the container 140 reduces mess and improves efficiency because the more unused build material 162 is collected after printing from the container 140 and from the trolley 102.

The method of cooling and unpacking a manufactured object 160 from a 3D printer, includes positioning the container 140 over the manufactured object located on a build platform of the trolley 102. The container 140 has an open end in order to position the container 140 over the manufactured objects 160. The method includes sliding the guillotine member 150 across the lower portion of the container 140 to form a base of the container 140 so that the manufactured objects 160 are inside the container 140. The method further includes selecting an apertured configuration of the guillotine member 150 to open a plurality of holes 152 in the guillotine member 150 to allow passage of air and build material 162 through the guillotine member 150, connecting a vacuum source to the connector 142 and controlling the vacuum source to cool down the manufactured objects 160 and control the flow of air through the container 140.

The method may further comprise vibrating the container 140 to unpack the manufactured objects 160 and collecting any unused build material which passes through the guillotine member into the trolley, or gets sucked into the vacuum, selecting a closed configuration of the guillotine member 150 to close the plurality of holes 152 in the guillotine, and removing the container 140 from the trolley 102 for further processing.

The material management station 106 in this example has a mixer 113 for mixing recycled build material from the internal recovered build material tank 108 with fresh material from one of the fresh build material supply tanks 114*a*, 114*b* for supply to the trolley 102 when it is loaded prior to a printing production process. The mixing of the two materials is performed in a mixing tank 112, which in this example, is provided on top of the material management station 106, above the location of the build platform when the trolley 102 is docked therein.

The fresh build material supply tanks 114*a*, 114*b*, the external overflow tank 110 and the main body of the material management station 106 may be constructed to fit together in a modular way, permitting a number of alternative geometrical configurations for the fully assembled material management station 106, this makes it adaptable fit into different housing spaces in a manufacturing environment.

The fresh build material supply tanks 114a, 114b may be releasably connected to the main body of the material management station 106 via respective supply tank connectors 134a, 134b. These supply tank connectors 134a, 134b may incorporate a security system to reduce the likelihood of unsuitable build material being used in the 3D printing system. In one example, suitable fresh build material supply tanks 114a, 114b are provided with a secure memory chip, which can be read by a chip reader (not shown) or other processing circuitry on the main body of the material management station 106 to verify the authenticity of any replacement supply tank (cartridge) 114a, 114b that has been installed. In this example, the chip reader may be provided on the supply tank connectors 134a, 134b and upon attachment of the fresh build material supply tanks 114a, 114b to the respective connector 134a, 134b, an electrical connection may be formed. The processing circuitry in the material management station 106 may also be used to write a measured weight of build material determined to be in the respective fresh build material supply tank(s) 114a, 114b onto the secure memory chip of the tank to store and/or update that value. Thus, the amount of build material remaining in the fresh build material supply tank(s) 114a, 114b at the end of a trolley loading process can be recorded.

Throughout the description and claims of this specification, the words "comprise" and "contain" and variations of them mean "including but not limited to", and they are not intended to (and do not) exclude other components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

Features, integers or characteristics described in conjunction with a particular example are to be understood to be applicable to any example described herein unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The disclosure is not restricted to the details of any foregoing examples. The disclosure extends to any novel one, or any novel combination, of the features disclosed in this specification (including any accompanying claims, abstract and drawings), or to any novel one, or any novel combination, of the steps of any method or process so disclosed.

The invention claimed is:

1. A container for receiving a manufactured object from a 3D printer, the container comprising:
   a wall forming sides of the container;
   a top extending to the sides of the container
   a connector for connection to a vacuum source; and
   a guillotine member;
   wherein a lower portion of the container has support members to slidably receive the guillotine member to form a base of the container;
   wherein the guillotine member is selectively adjustable between an apertured configuration having a plurality of through holes to allow passage of air and/or build material, and a closed configuration in which the through holes are closed so as to prevent build material from falling out of the container; and
   wherein the container is further provided with clamp points to receive a clamp arm from the 3D printer, the clamp arm being provided with a vibration mechanism for vibrating the container.

2. A container according to claim 1, further comprising a heater.

3. A container according to claim 1, wherein at least a portion of the wall is provided with a heat transfer plate.

4. A container according to claim 1, wherein the wall is provided with a thermal blanket.

5. A container according to claim 1, wherein the container is further provided with a vibrator for self-vibration of the container.

6. A container according to claim 1, wherein the through hole size ranges from an average particle size of the build material and a minimum size of the manufactured object.

7. A container according to claim 1, wherein the through hole shape is selected from the following: a circular-shape, a slit-shape, a cross-shape, an oval-shape, a square-shape, and a diamond-shape.

8. A 3D printing system comprising:
   a 3D printer for manufacturing an object,
   a material management system for supplying build material to the 3D printer,
   a trolley; and
   a container for receiving a manufactured object from a 3D printer, the container comprising:
   a wall forming sides of the container,
   a top extending to the sides of the container;
   a connector for connection to a vacuum source; and
   a guillotine member;
   wherein a lower portion of the container has support members to slidably receive the guillotine member to form a base of the container;
   wherein the guillotine member is selectively adjustable between an apertured configuration having a plurality of through holes to allow passage of air and/or build material, and a closed configuration in which the through holes are closed so as to prevent build material from falling out of the container; and
   wherein the container is further provided with clamp points to receive a clamp arm from the 3D printer, the clamp arm being provided with a vibration mechanism for vibrating the container,
   wherein the trolley comprises a build platform on which the object being manufactured is constructed and a build material store beneath the build platform.

9. A 3D printing system according to claim 8, wherein a vacuum source is provided to collect build material from the container for recycling build material within the material management system.

10. A method of cooling and unpacking a manufactured object from a 3D printer, the method comprising:
    positioning a container according to claim 1 over the manufactured object located on a build platform of a 3D printer trolley;
    sliding the guillotine member across the lower portion of the container to form a base of the container so that the manufactured object is inside the container;
    selecting an apertured configuration of the guillotine to open a plurality of holes in the guillotine to allow passage of build material through the guillotine;
    connecting a vacuum source to the connector and controlling the vacuum source to cool down the manufactured object.

11. A method according to claim 10, further comprising:
vibrating the container to unpack the manufactured object and collecting any unused build material which passes through the guillotine into the trolley;
selecting a closed configuration of the guillotine to close the plurality of holes in the guillotine; and
removing the container from the trolley for further processing.

12. A method according to claim 10, further comprising heating the container.

13. A method according to claim 10, further comprising vibrating the container by pulsing the vacuum source to create a plurality of pulses of air flow through the container.

14. A method according to claim 10, further comprising varying the strength of the vacuum source to create a plurality of a jets through the container.

15. A method according to claim 10, further comprising increasing and decreasing the strength of the vacuum source sequentially to create a plurality of a jets of different flow rates through the container.

* * * * *